US005570454A

United States Patent [19]

Liu

[11] Patent Number: 5,570,454

[45] Date of Patent: Oct. 29, 1996

[54] METHOD FOR PROCESSING SPEECH SIGNALS AS BLOCK FLOATING POINT NUMBERS IN A CELP-BASED CODER USING A FIXED POINT PROCESSOR

[75] Inventor: Weimin Liu, Germantown, Md.

[73] Assignee: Hughes Electronics, Los Angeles, Calif.

[21] Appl. No.: 257,831

[22] Filed: Jun. 9, 1994

[51] Int. Cl.[6] .................... G10L 3/02; H04B 1/66

[52] U.S. Cl. .................... 395/2.32; 395/2.28

[58] Field of Search .................... 395/2.32, 2.28, 395/2.71, 2.73

[56] References Cited

U.S. PATENT DOCUMENTS 5,195,137 3/1993 Swaminathan .................... 395/2.31
5,199,076 3/1993 Taniguchi et al. .................... 381/36
5,214,706 5/1993 Minde .................... 381/36
5,371,853 12/1994 Kao et al. .................... 395/2.32

OTHER PUBLICATIONS

Wonyong Sung, "*An Automatic Scaling Method for the programming of Fixed-Point Digital Signal Processors*", Seoul National University, IEEE, 1991.

*Primary Examiner*—Allen R. MacDonald
*Assistant Examiner*—John Michael Grover
*Attorney, Agent, or Firm*—Gordon R. Lindeen, III; Wanda K. Denson-Low

[57] ABSTRACT

A method of encoding speech using a fixed-point processor. The method treats the signal as floating point, while operating on each sample of the signal as fixed point. The disclosed method achieves precision similar to that of conventional floating point and may be rapidly executed on a fixed point processor.

12 Claims, 6 Drawing Sheets

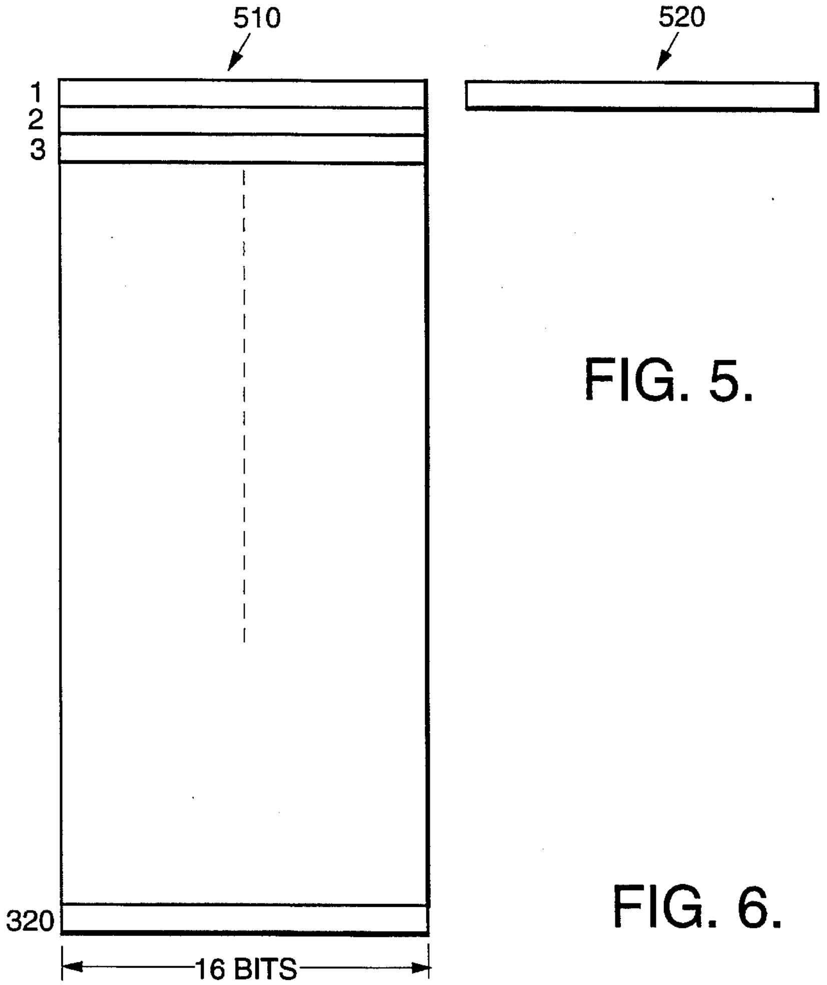
FIG. 5.
FIG. 6.
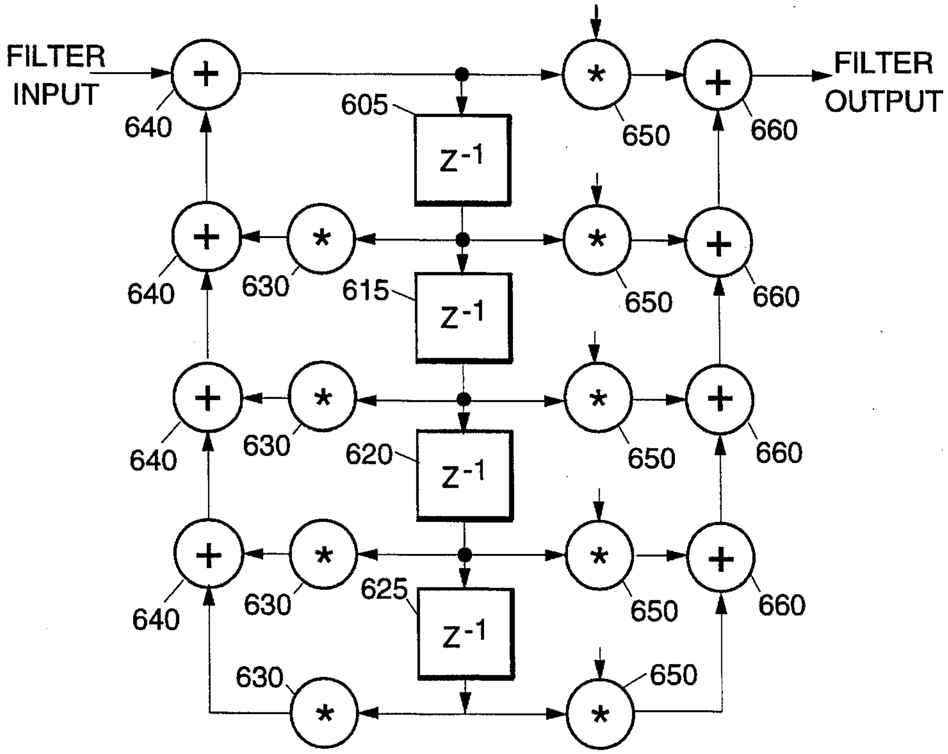

METHOD FOR PROCESSING SPEECH SIGNALS AS BLOCK FLOATING POINT NUMBERS IN A CELP-BASED CODER USING A FIXED POINT PROCESSOR

BACKGROUND OF THE INVENTION

1. Field of the Invention

The present invention generally relates to a method of processing a signal such as speech, and, more particularly, to a method that efficiently processes multiple samples of such a signal.

2. Description of the Related Art

A typical signal processing technique samples an input signal and arithmetically processes the samples. The typical technique requires extensive hardware to process the signal with sufficient speed, because of the large number of samples and large amount of computation required to encode the input signal.

SUMMARY OF THE INVENTION

It is an object of the present invention to provide a method of processing a signal containing speech while avoiding some of the hardware complexity required by typical processing techniques.

Additional objectives and advantages of the invention will be set forth in the description that follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a method of processing an input signal is used. The method comprises the steps of sampling the input signal to generate a plurality of blocks of samples, each block including a plurality of amplitudes, and a scale common to the plurality of amplitudes, the scale being determined by a portion of the input signal; and processing the plurality of blocks to generate a signal approximating the input signal.

BRIEF DESCRIPTION OF THE DRAWINGS

The foregoing and other objects, aspects and advantages will be better understood from the following detailed description of a preferred embodiment of the invention with reference to the drawings, in which:

FIG. 5 is a diagram of a signal frame;

FIG. 6 is a diagram showing the high pass filter of FIG. 1 in more detail;

DETAILED DESCRIPTION OF A PREFERRED EMBODIMENT

Figure 1:
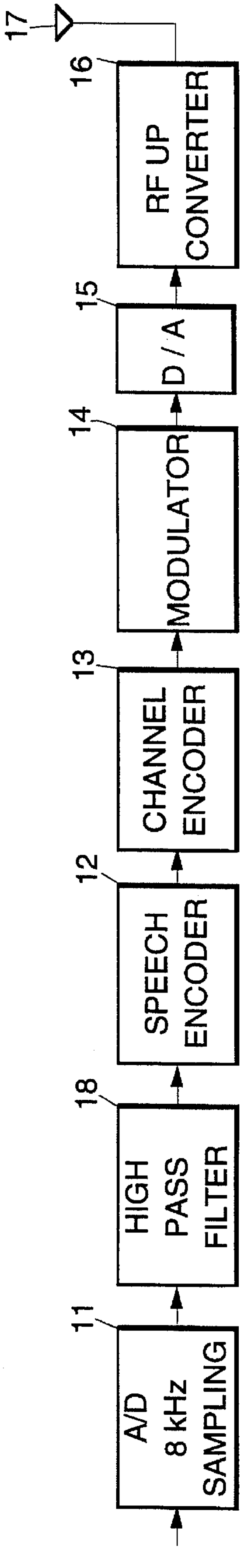
FIG. 1 is a block diagram of a transmitter in a wireless communication system according to a preferred embodiment of the invention.

In the transmitter of the preferred communication system, as shown in FIG. 1, analog-to-digital (A/D) converter 11 samples analog speech from a telephone handset at an 8 KHz rate, converts the sampled analog signal to digital values and supplies the digital values to a high-pass, fourth order biquad, filter 18. The transfer function of high-pass filter 18 is:

$$\frac{b_0 + b_1 Z^{-1} + b_2 Z^{-2} + b_3 Z^{-3} + b_4 Z^{-4}}{1 + a_1 Z^{-1} + a_2 Z^{-2} + a_3 Z^{-3} + a_4 Z^{-4}}$$

wherein $b_0$=0.89802504, $b_1$=−3.59010601, $b_2$=5.38416243, $b_3$=−3.5901601, $b_4$=0.89802492, $a_1$=−3.78284979, $a_2$=5.37379122, $a_3$=−3.39733505, and $a_4$=0.80644900.

The high pass filter 18 attenuates D.C. or hum contamination that may occur in the incoming speech signal.

Speech encoder 12 encodes the signal and channel encoder 13 further encodes the signal, as may be required in a digital cellular communications system, and supplies a resulting encoded bit stream to a modulator 14. Digital-to-analog (D/A) converter 15 converts the output of the modulator 14 to Phase Shift Keying (PSK) signals. Radio frequency (RF) up converter 16 amplifies and frequency multiplies the PSK signals and supplies the amplified signals to antenna 17.

Figure 2:
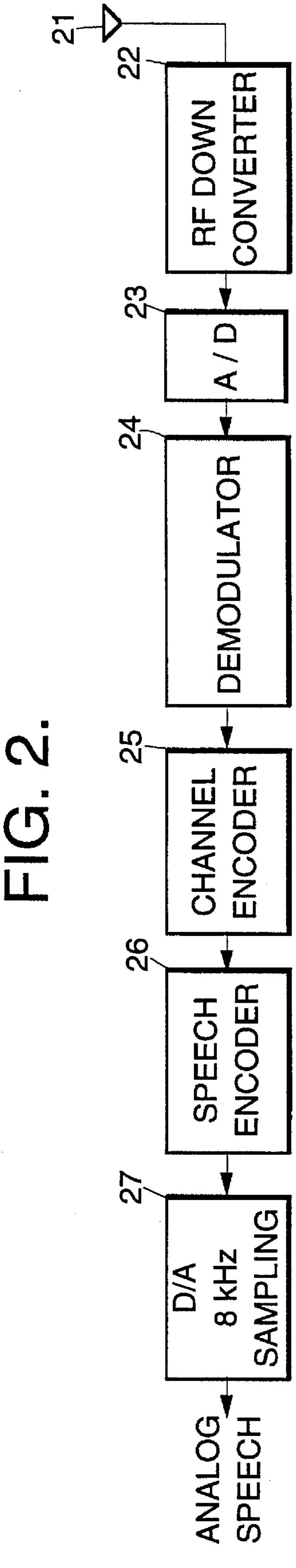
FIG. 2 is a block diagram of a receiver in a wireless communication system according to the preferred embodiment of the invention.

In the receiver of the preferred communication system, as shown in FIG. 2, RF down converter 22 receives a signal from antenna 21 and heterodynes the signal to an intermediate frequency (IF). A/D converter 23 converts the IF signal to a digital bit stream, and demodulator 24 demodulates the resulting bit stream. At this point, the reverse of the encoding process in the transmitter takes place. Channel decoder 25 and speech decoder 26 perform decoding. D/A converter 27 synthesizes analog speech from the output of the speech decoder.

Much of the processing described in this specification is performed by an AT&T DSP1610 signal processor executing program statements. To facilitate a description of the preferred communication system, however, that system is illustrated in terms of block and circuit diagrams. One of ordinary skill in the art can readily transcribe these diagrams into program statements for a processor.

Figure 3:
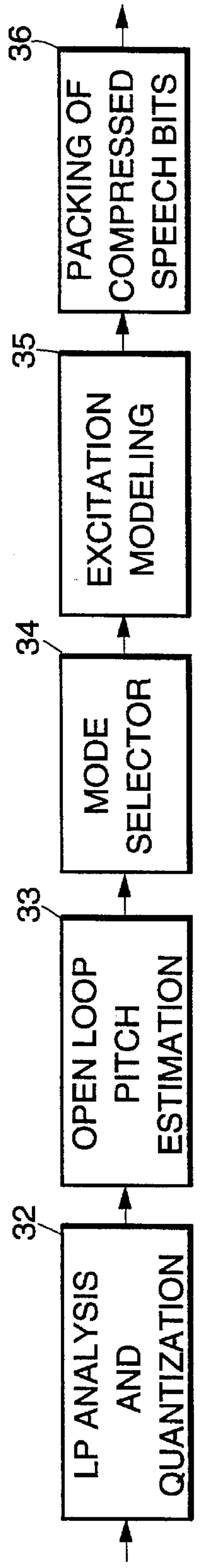
FIG. 3 is block diagram of the speech encoder in the transmitter shown in FIG. 1.

FIG. 3 shows the encoder 12 of FIG. 1 in more detail as including a linear predictive (LP) analysis and quantization module 32, and open loop pitch estimation module 33. Module 34 analyzes each frame of the signal to determine whether the frame is a voiced and stationary mode (Mode A), an unvoiced or transient mode (Mode B), or a background noise mode (Mode C). Module 35 performs excitation modelling depending on the mode determined by module 34. Processor 36 compacts compressed speech bits.

Figure 4:
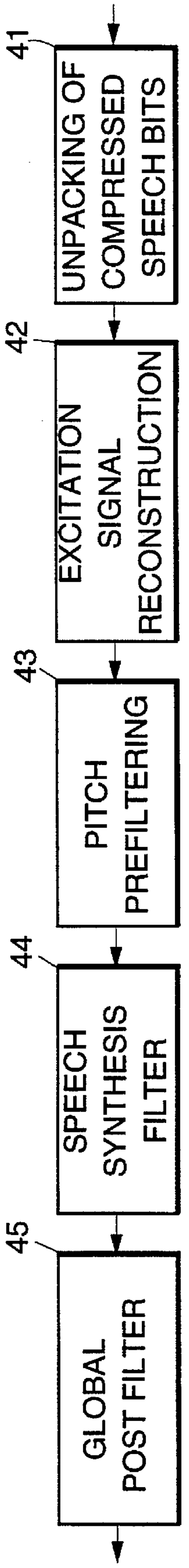
FIG. 4 is a block diagram of the speech decoder in the receiver shown in FIG. 2.

FIG. 4 shows the decoder 26 of FIG. 2 as including a processor 41 for unpacking of compressed speech bits, module 42 for excitation signal reconstruction, filter 43, speech synthesis filter 44, and global post filter 45.

The system shown in FIGS. 1–4 is described in more detail in pending prior application filed Apr. 18, 1994, of Kumar Swaminathan, Kalyan Ganesan, and Prabhat K. Gupta for METHOD OF ENCODING A SIGNAB CONTAINING SPEECH Ser. No. 08/229,271, the contents of which are incorporated by reference.

A/D converter 11 generates output values into a buffer, to organize the input signal into frames. Each frame typically contains 40 ms worth of samples organized as 5 to 8 subframes. FIG. 5 shows a frame 500. Each frame includes a vector 510 having 320 values. Each value is a 16 bit mantissa, which may be conceptualized as an amplitude value. The frame also includes an exponent 520, which may be conceptualized as a scale value. The exponent 520 is common to all the 320 mantissas in vector 510. Thus, frame 500 may be conceptulized as a floating point block.

Thus A/D convertor 11 acts to sample an input signal to generate a plurality of blocks of samples, each block including a plurality of mantissas, and an exponent common to the plurality of mantissas.

The remaining modules in FIGS. 1 and 2 (speech encoder 12, channel encoder 13, modulator 14, Digital-to-analog (D/A) converter 15, up converter 16, antenna 17, RF down converter 22, antenna 21, A/D converter 23, demodulator 24, channel decoder 25, speech decoder 26, and D/A converter 27) act to process the plurality of blocks to generate a signal approximating the input signal.

FIG. 6 represents high pass filter 18 in more detail. Delays 605, 615, 620, and 625 are implemented as storage locations that are managed as a first-in-first-out (FIFO) shift register. Multipliers 630 and 650 each have respective coefficient inputs to implement the filer transfer function.

Figure 7:
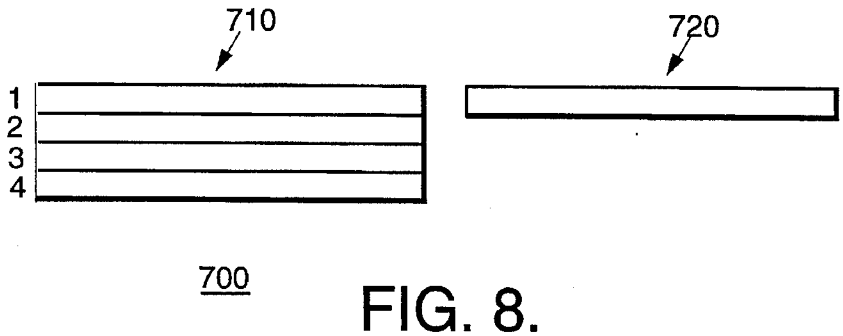
FIG. 7 is a diagram showing another aspect of the high-pass filter shown in FIG. 1.

FIG. 7 shows a floating point block 700 including vector 710, containing a storage location for the mantissa of each of delays 605, 615, 620, and 625, and an exponent 720 common to each of the mantissas.

Figure 8:
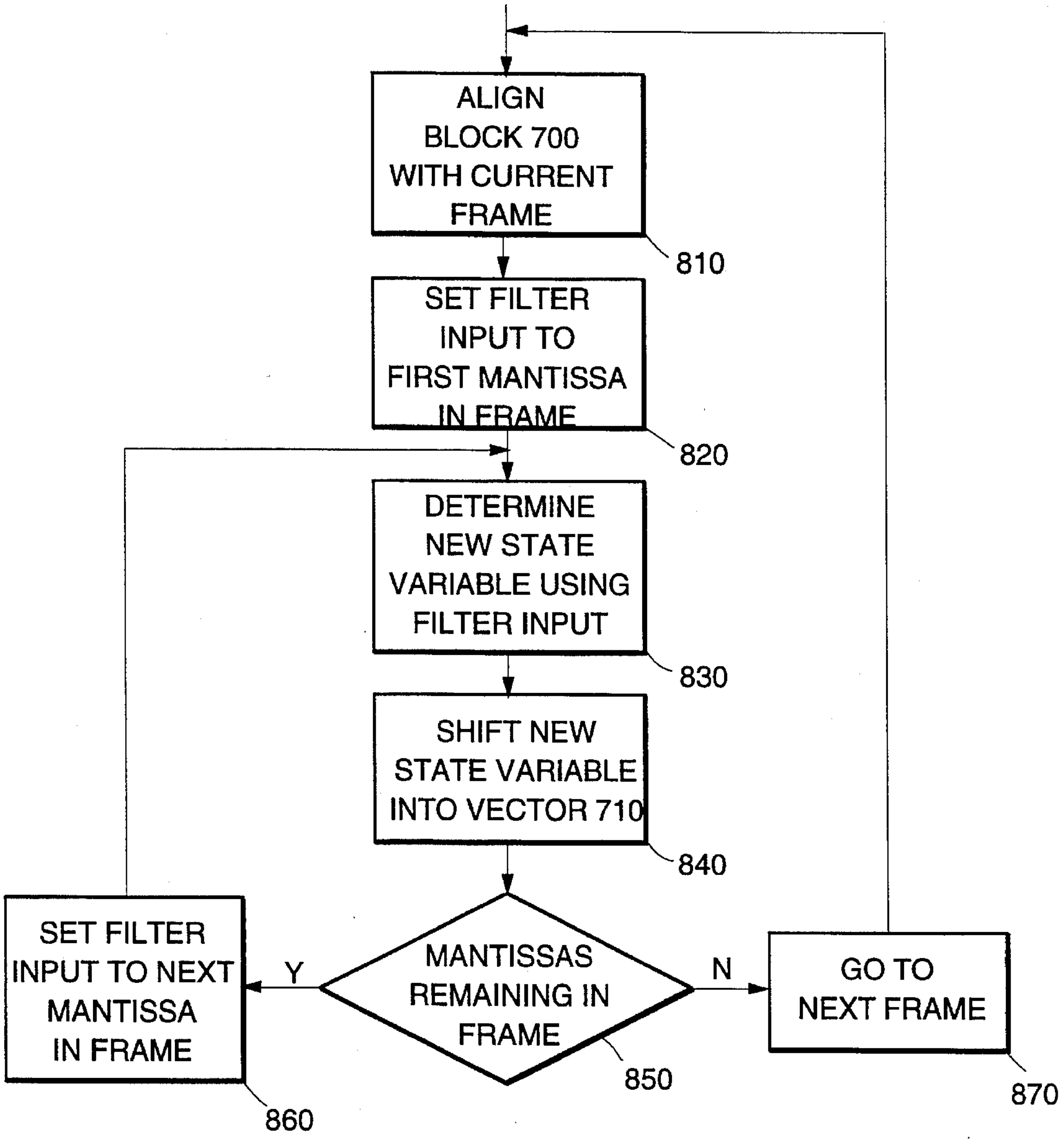
FIG. 8 is a flow chart illustrating the operation of the high-pass filer shown in FIG. 6.

FIG. 8 shows the processing performed by the filter illustrated in FIGS. 6 and 7. The processing shown in FIG. 8 is performed for each frame of the input signal. First, the filter input and the block 700 are aligned, as discussed in more detail below (step 810). Starting with the first mantissa of the frame (step 820), a new value is determined for the input to delay 605, and the new value is shifted into the shift register having delays 605, 615, 620 and 625, and a new value is determined for the filter output (step 830). Steps 830 and 840 are performed for each mantissa in the frame (steps 850 and 860). Thus, an entire frame of 320 samples may be filtered without adjusting an exponent at each arithmatic operation.

Step 810 is implemented with a function that processes two floating point blocks, X and Y, so that they have the same exponent. If Rx=the number of bits the mantissas of block X may be left shifted without overflow, Ex=the exponent of block X, Ry=the number of bits the mantissas of block Y may be left shifted without overflow, Ey=the exponent of block Y, C=max(Ex-Rx, Ey-Ry)+leeway, then the alignment procedure is:

(1) left-shift mantissas of X by Ex-C bits (2) left-shift mantissas of Y by Ey-C bits (3) Ex=C, Ey=C, wherein leeway is a margin that allows mantissas to be left-shifted without overflow. The purpose of the leeway is to prevent overflow in the result vector, or in any intermediate result. The amount of leeway needed for a particular filter varies with the type of filter, as discussed later in the application.

The DSP1610 implementation of this alignment procedure is 7 cycles/element for single precision blocks.

In other words, the filter of FIG. 6 acts to filter the first plurality of blocks (the filter input) by maintaining a third block (block 700) representing filter state values, the third block including a third plurality of mantissas, and a third scale common to the third plurality of mantissas. The filter adjusts scale 720 depending on the scale 520, by aligning the first and third plurality of blocks. For each mantissa in the filter input, the filter determines a state value, to be shifted into delay 605. The adders 660 set one of the third mantissas (one of the mantissas in the filter output) depending on the state values.

Figure 9:
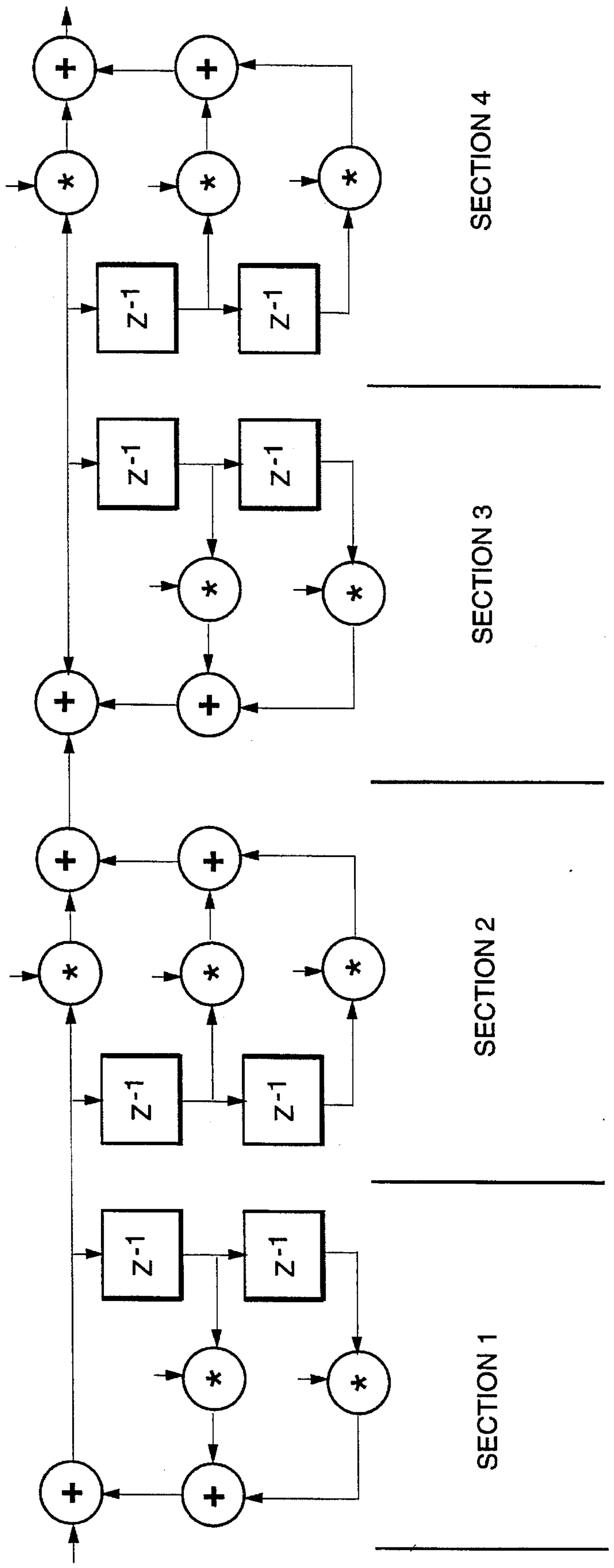
FIG. 9 is a representation of the high-pass filter shown in FIG. 1, optimized for a processor with a small cache.

FIG. 9 shows an alternate representation of the filter shown in FIG. 6. The filter of FIG. 9 has the same transfer function as the filter as FIG. 6. The advantage of the filter of FIG. 9 is that the instructions to implement each section of the filter fit into the instruction cache of the DSP1610, allowing the filter to operate at high speed.

Figure 10:
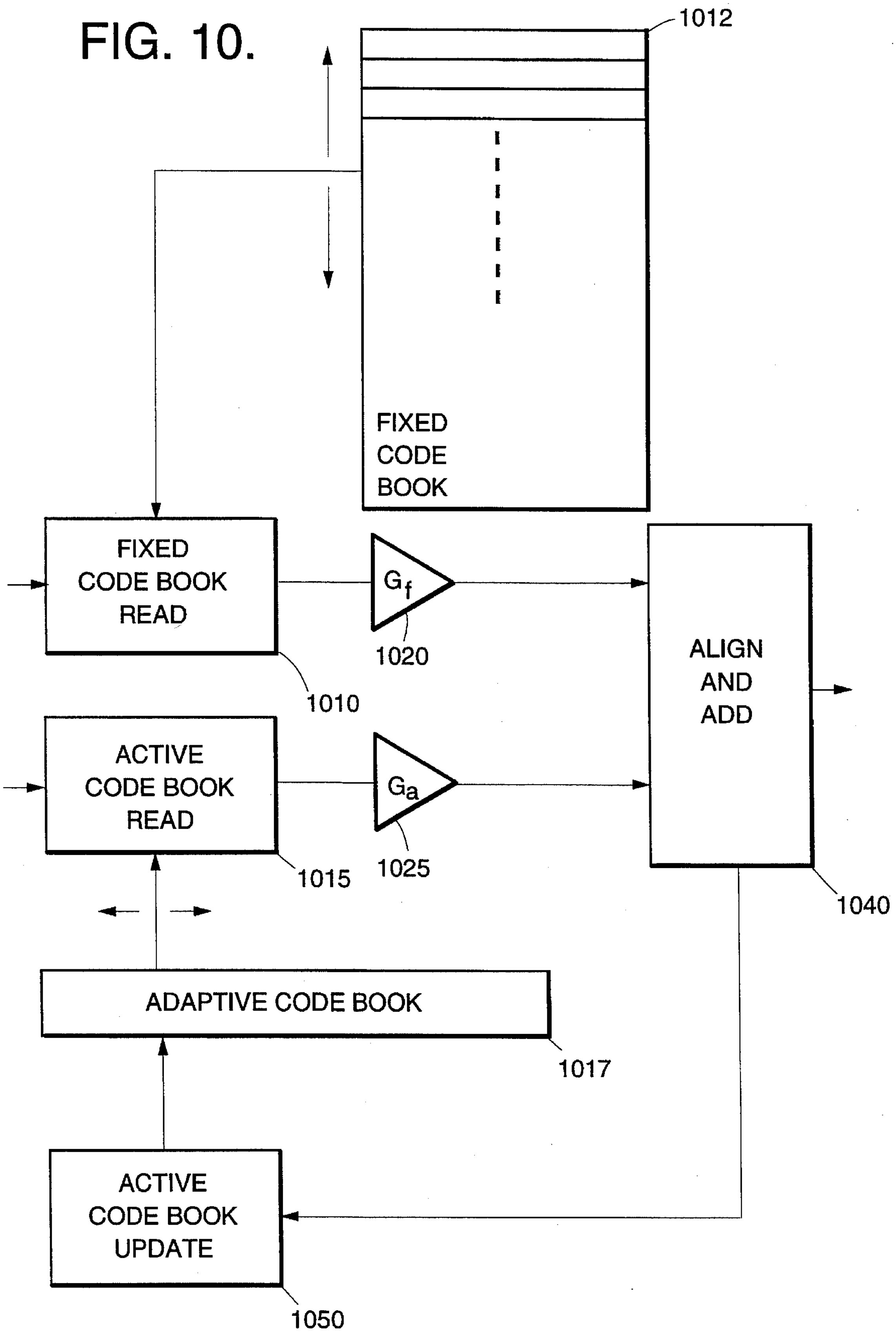
FIG. 10 is a block diagram of the signal reconstructor shown in FIG. 4 in more detail.

FIG. 10 shows the excitation signal reconstructor 42 of FIG. 4 in more detail. Fixed codebook read module 1010 receives a fixed codebook index from unpacking module 41, reads the fixed codebook 1012 using the index, and sends a floating point block, consisting of 40 or 64 samples, to scaling module 1020. Although fixed codebook 1012 may be a table, the preferred communication system implements fixed codebook read module 1010 and fixed codebook 1012 as an algorithm that produces a floating point block from the indexes received from unpacking module 41.

Adaptive codebook read module 1015 receives an adaptive codebook index from unpacking module 41, uses the index to read a floating point block, consisting of 40 or 64 samples, from adaptive codebook 1017, and sends the floating point block to scaling module 1025.

Scaling modules 1020 and 1025 each receive a floating point block input and a scaler input $K_1$ and $K_2$ at 1100, 1102, the scaler having a single mantissa and a single exponent, and each produce a floating point block. In other words, each scaling module acts to process a plurality of blocks to generate a second plurality of blocks, each including a second plurality of amplitudes, and a second scale common to the second plurality of amplitudes.

Align and add module 1040 adds two floating point blocks by first adjusting each floating point block such that they share a common exponent, and such that each mantissa in each block has at least one bit of leeway. Align and add module 1040 generates a floating point block and sends the floating point block to pitch prefiltering module 43. Align and add module 1040 also sends the floating point block to adaptive codebook update module 1050.

In other words, align and add module 1040 processes a first plurality of blocks from scaling module 1020 to generate an output having a second plurality of blocks, each including a second plurality of amplitudes, and a second scale common to the second plurality of amplitudes. More specifically, align and add module 1040 adds the first plurality of blocks to a third plurality of blocks from scaling module 1025, and generates each second scale value in accordance with the first scale and the third scale.

Adaptive codebook update module 1050 maintains adaptive codebook 1017 as a normalized floating point block. In other words, as update module 1050 writes a block of samples to adaptive codebook 1017, update module 1050 adjusts the exponent and each mantissa in the adaptive codebook such that the adaptive codebook 1017 is normalized, meaning that a left shift of the mantissas would cause at least one of the mantissas to overflow.

In other words, adaptive codebook 1017 is a block having a common exponent and multiple mantissas. A codebook update replaces a portion of the codebook with a signal vector. Before the update, the signal vector is aligned with the remaining portion of the codebook (the portion of the codebook exluding the portion being replaced). No normalization leeway for the codebook itself is necessary.

The adaptive code book read module 1015 acts to read from a portion of adaptive code book 1017, and align and add module 1040 generates a filter excitation signal. Update module 1050 writes a portion of the adaptive codebook with the filter excitation signal. If necessary to maintain the adaptive codebook in a normalized state, update module 1050 also adjusts a remaining portion, the exponent and remaining mantissas, of the adaptive code book so that the adaptive code book is normalized.

Thus, the preferred communication system achieves precision similar to that of a conventional floating point processor with a fixed point processor.

In general the invention may be practiced with any filter employed in a CELP speech encoder. For speech linear prediction filters, the adequate normalization leeway is 3 or 4 bits. FIR filtering may be accomplished by aligning each filter input frame with the filter state variables. IIR filtering may be accomplished in a manner similar to FIR filtering, except that the state variables may have an exponent different from that of the filter input frame and filter output. If this exponent difference is set to be constant, then the block floating-point treatment of IIR filters is the same as that of FIRs.

Additional advantages and modifications will readily occur to those skilled in the art. The invention, in its broader aspects, is therefore not limited to the specific details, representative apparatus, and illustrative examples shown and described. Various modifications and variations can be made to the present invention without departing from the scope or spirit of the invention, and it is intended that the present invention cover the modifications and variations provided they come within the scope of the appended claims and their equivalents.

What is claimed is:

1. In a CELP coder, a method of filtering a first plurality of blocks including a first plurality of amplitudes and a first scale, the method comprising the steps of:

shifting each of said first plurality of blocks into a filter comprising a plurality of filter coefficients and a plurality of delays, each of said delays corresponding to at least one of an amplitude from a third block including a third plurality of amplitudes and a third scale; and calculating a second amplitude after each of the first plurality of amplitudes is shifted into the filter, the amplitude being a function of the third block, the filter coefficients and the shifted one of the first plurality of amplitudes, the second amplitude becoming part of a second plurality of amplitudes having a second scale.

2. The method of claim 1 wherein the filtering step further comprises the steps aligning the first block with a third block when the first amplitude of a first block is input into the filter, by calculating an aligned scale and left shifting the first and third pluralities of amplitudes to accommodate the aligned scale; and setting the second scale to be the aligned scale.

3. The method of claim 2 wherein the step of calculating a second amplitude further comprises adding each amplitude of the first plurality of amplitudes to a corresponding amplitude in the third plurality of amplitudes to generate the second block of amplitudes with a second scale equal to the aligned scale.

4. The method of claim 3 wherein the step of aligning the first block with the third block further comprises the steps of:

calculating a first room by subtracting a first number of left shifts that can be performed on each of the first plurality of amplitudes without an overflow from the first scale;

calculating a second room by subtracting a second number of left shifts that can be performed on each of the third plurality of amplitudes without an overflow from the third scale;

adding a leeway to a maximum of the first and second room values to generate un aligned scale;

left shifting each of the first plurality of amplitudes by the difference between the first scale and the aligned scale;

left shifting each of the third plurality of amplitudes by the difference between the third scale and the aligned scale; and assigning the value of the aligned scale to the first and third scales.

5. A method of updating a codebook having a plurality of codebook amplitudes and a codebook scale, comprising the steps of:

selecting a first block having a first plurality of amplitudes and a first scale;

defining a third block, the block including a plurality of amplitudes that will be left after the codebook is updated and a third scale equal to the codebook scale;

aligning the first block with the third block by calculating an aligned scale and left shifting the first and third pluralities of amplitudes to accommodate the aligned scale; and writing the first plurality of amplitudes to a portion of the codebook.

6. The method of claim 5 wherein the step of aligning the first block with the third block further comprises the steps of:

calculating a first room by subtracting a first number of left shifts that can be performed on each of the first plurality of amplitudes without an overflow from the first scale;

calculating a second room by subtracting a second number of left shifts that can be performed on each of the third plurality of amplitudes without an overflow from the third scale;

adding a leeway to a maximum of the first and second room values to generate an aligned scale;

left shifting each of the first plurality of amplitudes by the difference between the first scale and the aligned scale;

left shifting each of the third plurality of amplitudes by the difference between the third scale and the aligned scale; and assigning the value of the aligned scale to the first and third scales.

7. In a CELP coder, an apparatus for filtering a first plurality of blocks including a first plurality of amplitudes and a first scale, the apparatus comprising:

means for shifting each of said first plurality of blocks into a filter comprising a plurality of filter coefficients and a plurality of delays, each of said delays corresponding to at least one of an amplitude from a third block including a third plurality of amplitudes and a third scale; and means for calculating a second amplitude after each of the first plurality of amplitudes is shifted into the filter, the amplitude being a function of the third block, the filter coefficients and the shifted one of the first plurality of amplitudes, the second amplitude becoming part of a second plurality of amplitudes having a second scale.

8. The apparatus of claim 7 wherein the apparatus further comprises:

means for aligning the first block with a third block when the first amplitude of a first block is input into the filter, by calculating an aligned scale and left shifting the first and third pluralities of amplitudes to accommodate the aligned scale; and means for setting the second scale to be the aligned scale.

9. The apparatus of claim 8 wherein the means for calculating a second amplitude further comprises means for adding each amplitude of the first plurality of amplitudes to a corresponding amplitude in the third plurality of amplitudes to generate the second block of amplitudes with a second scale equal to the aligned scale.

10. The apparatus of claim 9 wherein the means for aligning the first block with the third block further comprises:

means for calculating a first room by subtracting a first number of left shifts that can be performed on each of the first plurality of amplitudes without an overflow from the first scale;

means foe calculating a second room by subtracting a second number of left shifts that can be performed on each of the third plurality of amplitudes without an overflow from the third scale;

means for adding a leeway to a maximum of the first and second room values to generate an aligned scale;

means for left shifting each of the first plurality of amplitudes by the difference between the first scale and the aligned scale;

means for left shifting each of the third plurality of amplitudes by the difference between the third scale and the aligned scale; and means for assigning the value of the aligned scale to the first and third scales.

11. An apparatus for updating a codebook having a plurality of codebook amplitudes and a codebook scale, comprising:

means for selecting a first block having a first plurality of amplitudes and a first scale;

means for defining a third block, the block including a plurality of amplitudes that will be left after the codebook is updated and a third scale equal to the codebook scale;

means for aligning the first block with the third block by calculating an aligned scale and left shifting the first and third pluralities of amplitudes to accommodate the aligned scale; and means for writing the first plurality of amplitudes to a portion of the codebook.

12. The apparatus of claim 11 wherein the means for aligning the first block with the third block further comprises:

means for calculating a first room by subtracting a first number of left shifts that can be performed on each of the first plurality of amplitudes without an overflow from the first scale;

means for calculating a second room by subtracting a second number of left shifts that can be performed on each of the third plurality of amplitudes without an overflow from the third scale;

means for adding a leeway to a maximum of the first and second room values to generate an aligned scale;

means for left shifting each of the first plurality of amplitudes by the difference between the first scale and the aligned scale;

means for left shifting each of the third plurality of amplitudes by the difference between the third scale and the aligned scale; and means for assigning the value of the aligned scale to the first and third scales.

* * * * *